United States Patent
Kirk (10) Patent No.: US 7,620,030 B1
(45) Date of Patent: Nov. 17, 2009

(54) METHOD AND APPARATUS FOR TERMINATING/GENERATING PHYSICALLY AND VIRTUALLY CONCATENATED SIGNALS

(75) Inventor: David Kirk, Manotick (CA)

(73) Assignee: Exar Corporation, Fremont, CA (US)

( * ) Notice: Subject to any disclaimer, the term of this patent is extended or adjusted under 35 U.S.C. 154(b) by 669 days.

(21) Appl. No.: 10/993,138

(22) Filed: Nov. 19, 2004

Related U.S. Application Data (60) Provisional application No. 60/524,328, filed on Nov. 21, 2003.

(51) Int. Cl.
    *H04L 12/28* (2006.01)
(52) U.S. Cl. ...................................... 370/351
(58) Field of Classification Search ........................ None
    See application file for complete search history.

(56) References Cited

U.S. PATENT DOCUMENTS

| 6,041,043 | A | * | 3/2000 | Denton et al. ................ 370/254 |
| 7,277,459 | B1 | * | 10/2007 | Abbas ......................... 370/539 |
| 2002/0126695 | A1 | * | 9/2002 | Yoshida ....................... 370/465 |

OTHER PUBLICATIONS

"Link capacity adjustment scheme (LCAS) for virtual concatenated signals," ITU-T Telecommunication Standardization Sector of ITU, Series G: Transmission Systems and Media, Digital Systems and Networks, Series Y: Global Information Infrastructure and Internet Protocol Aspects, ITU-T G.7042/Y.1305 (Nov. 2001)-Prepublished version.

"Sonet 101", author and date unknown.

"Tektronix Synchronous Optical Network (SONET)," the International Engineering Consortium, Web ProForum Tutorials, http://www.iec.org, date unknown.

* cited by examiner

*Primary Examiner*—Ayaz R Sheikh
*Assistant Examiner*—Blanche Wong
(74) *Attorney, Agent, or Firm*—Nixon Peabody LLP

(57) ABSTRACT

A SONET signal is terminated by pointer processing a physically concatenated SONET signal to output a pointer processed physically concatenated SONET signal. Virtual concatenation-related byte markers (for example, H4 and J1) are then inserted into the pointer processed physically concatenated SONET signal. Virtual concatenation overhead data (for example, MFI and SEQ#) is then inserted into the pointer processed physically concatenated SONET signal so as to produce a converted virtually concatenated SONET signal. Virtual concatenation logic processing is then performed on the converted virtually concatenated signal. In this way, a physically concatenated SONET signal can be received and processed on a single integrated circuit with a virtual concatenation logic processor receiver this obviating the need for including a separate physically concatenated logic processing receiver or multiple integrated circuit chips.

71 Claims, 5 Drawing Sheets

FIG. 6

METHOD AND APPARATUS FOR TERMINATING/GENERATING PHYSICALLY AND VIRTUALLY CONCATENATED SIGNALS

CROSS-REFERENCE

This application claims the benefit of U.S. Provisional Application for Patent No. 60/524,328, filed Nov. 21, 2003, the disclosure of which is hereby incorporated by reference.

BACKGROUND OF THE INVENTION

1. Technical Field of the Invention

The present invention relates to SONET signals and, in particular to the termination and generation of physically and virtually concatenated signals.

2. Description of Related Art

The use of physical concatenation (also referred to as contiguous concatenation in Europe SDH and concatenation with respect to SONET) and virtual concatenation signals in data transport is well known to those skilled in the art.

Historically, those who design SONET receivers have provided separate logic blocks in their receivers to separately handle received physically and virtually concatenated signals. This solution is not desired as the receiver would include numerous logic gates (circuitry) and occupies significant silicon real estate. There would be an advantage if the amount of space needed on silicon to support both physically and virtually concatenated SONET signals could be reduced.

The present invention addresses the foregoing and other needs in the art.

SUMMARY OF THE INVENTION

In accordance with one embodiment, a SONET signal is terminated by receiving either virtually concatenated or physically concatenated SONET signals. Pointer processing is then performed to output a pointer processed virtually concatenated SONET signal or a pointer processed physically concatenated SONET signal. Virtual concatenation overhead data is then inserted into the pointer processed physically concatenated SONET signal so as to produce a converted virtually concatenated SONET signal. The pointer processed virtually concatenated SONET signal or the converted virtually concatenated SONET signal are then output for virtual concatenation logic processing.

In accordance with another embodiment, a signal is terminated by pointer processing a physically concatenated signal to output a pointer processed physically concatenated signal. Virtual concatenation-related byte markers are then inserted into the pointer processed physically concatenated signal. Virtual concatenation overhead data is then inserted into the pointer processed physically concatenated signal so as to produce a converted virtually concatenated signal. Virtual concatenation logic processing is then performed on the converted virtually concatenated signal.

In accordance with another embodiment a signal is generated by virtual concatenation logic processing to produce a virtual concatenation signal. A pointer inserted virtually concatenated signal is produced from the virtual concatenation signal. Virtual concatenation overhead data is then stripped from the pointer inserted virtually concatenated signal to generate a physically concatenated signal.

In accordance with another embodiment a physically concatenated signal is terminated by processing the signal to identify path overhead location output a processed physically concatenated signal. Virtual concatenation overhead data is then inserted into the processed physically concatenated signal so as to produce a converted virtually concatenated signal. Virtual concatenation logic processing is then performed on the converted virtually concatenated signal.

In accordance with another embodiment, an integrated circuit comprises a single integrated circuit substrate which includes a signal termination circuit operable to terminate both a received virtually concatenated signal and a received physically concatenated signal. The signal termination circuit comprises a virtual concatenation logic circuit and a conversion circuit. The conversion circuit operates to convert the received physically concatenated signal into a converted virtually concatenated signal suitable for processing by the virtual concatenation logic circuit.

BRIEF DESCRIPTION OF THE DRAWINGS

A more complete understanding of the invention may be obtained by reference to the accompanying drawings wherein.

DETAILED DESCRIPTION OF THE DRAWINGS

As used herein, the terms "physically concatenated," "physical concatenation," or the like, mean and refer to physical, as opposed to virtual, concatenation signals and operations known in the art including, without limitation, European SDH contiguous concatenation and SONET concatenation. The terms "virtually concatenated," "virtual concatenation," or the like, mean and refer to virtual, as opposed to physical, concatenation signals and operations known in the art including, without limitation, OTN virtual concatenation.

Figure 1:
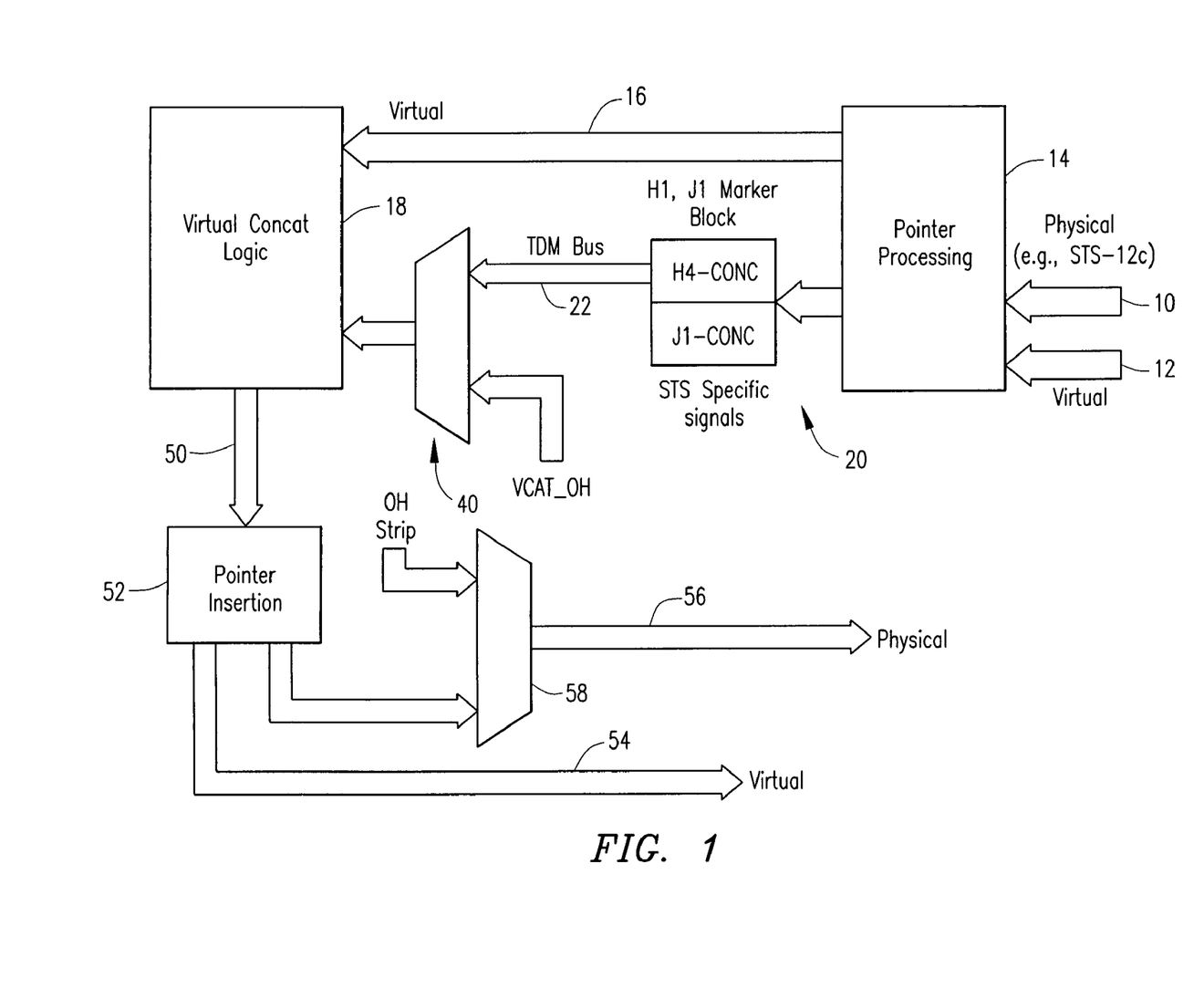
FIG. 1 is a block diagram illustrating an architecture of a receiver/transmitter capable of processing both virtually and physically concatenated signals.

Reference is now made to FIG. 1 wherein there is shown a block diagram illustrating an architecture of a SONET receiver/transmitter for processing both physically and virtually concatenated signals. Advantageously, in accordance with embodiments of the invention, an integrated circuit for such a receiver/transmitter need only include virtual concatenation logic. In other words, with such a receiver/transmitter, one eliminates the need for the logic normally included in SONET receivers/transmitters for handling physically concatenated SONET signals. This advance in the art is accomplished by recognizing that a physically concatenated SONET signal can be converted by the receiver into a signal that appears to be virtually concatenated. That converted signal, as well as conventional virtually concatenated SONET signals which are received, may then be processed in an efficient and effective manner by the solely included virtual concatenation logic. Conversely, on the transmit side, the advance is accomplished by recognizing that virtually concatenated transmit signal can be converted into a signal that appears to be physically concatenated.

Although not shown in FIG. 1, it will be understood by those skilled in the art that the receiver/transmitter includes additional circuits (upstream on the receive side and downstream on the transmit side) which perform, for example, standard line and section termination functions. Such circuits are not pertinent to embodiments of the present invention and therefore are neither shown nor discussed.

In FIG. 1, it will be noted that the integrated circuit SONET receiver/transmitter is capable of receiving/transmitting either or both physically concatenated SONET signals 10 and 56 and virtually concatenated SONET signals 12 and 54. Each type of SONET signal 10 and/or 12 is received by a conventional pointer processor block 14 This pointer processor block 14 need not perform any additional functions beyond those functions which are readily understood by those skilled in the art. For example, the pointer processor block 14 performs commonly understood pointer processing functions (as specified in the relevant SONET/SDH standard) and outputs SONET SPE data along with byte markers, specifically, the J1 and H4 byte markers.

To the extent the received SONET signal is a virtually concatenated signal 12, it is output 16 from the pointer processing block (following conventional pointer processor handling) as a pointer processed virtually concatenated signal to the virtual concatenation logic 18. This process is essentially identical to the received SONET virtually concatenated signal handling process which is well known in the art.

What happens with the received physically concatenated SONET signal 10, however, is quite different from the conventional processing technique which historically utilized a separate physical concatenation logic. The pointer processing block 14 handled physically concatenated SONET signal 10 (i.e., a pointer processed physically concatenated signal) is next processed in an H4/J1 marker replication block 20. This block 20 functions to process the single J1 and H4 marker signals present for the received (input) physically concatenated signal 10 to produce J1 and H4 markers for each of the constituent STS signals comprising the larger physically concatenated signal 10. Marker replication in essence adds to the physically concatenated SONET signal 10 duplicate H4 and J1 marker bytes at the appropriate time slot locations where a virtual concatenation logic processor would expect to find such information (in a conventional virtually concatenated signal). These time slot locations are considered to be fixed stuff in a physically concatenated signal 10.

Figure 2A:
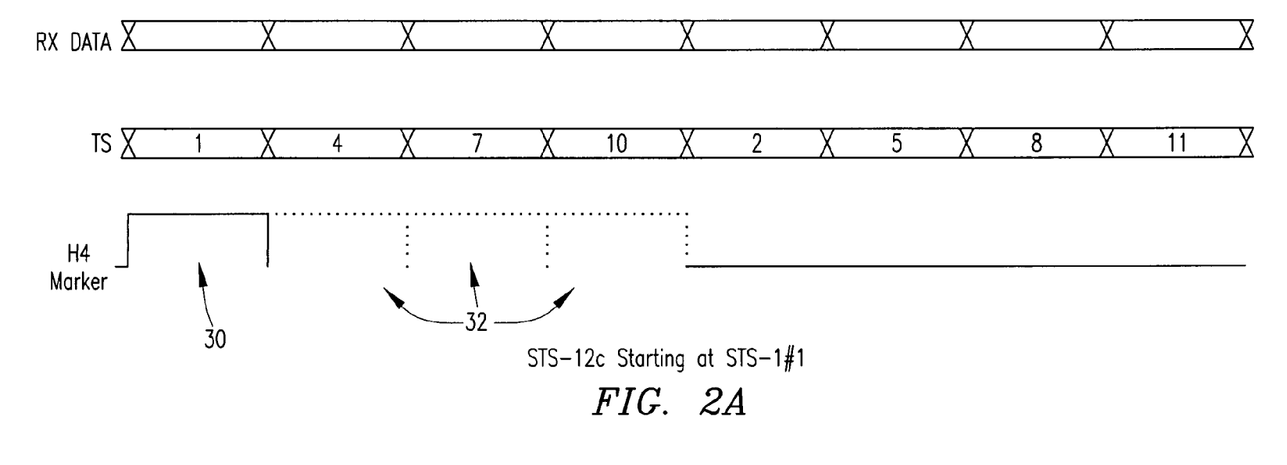
FIGS. 2A and 2B illustrate time slot progressions for the H4 and J1 bytes, respectively.
Figure 2B:
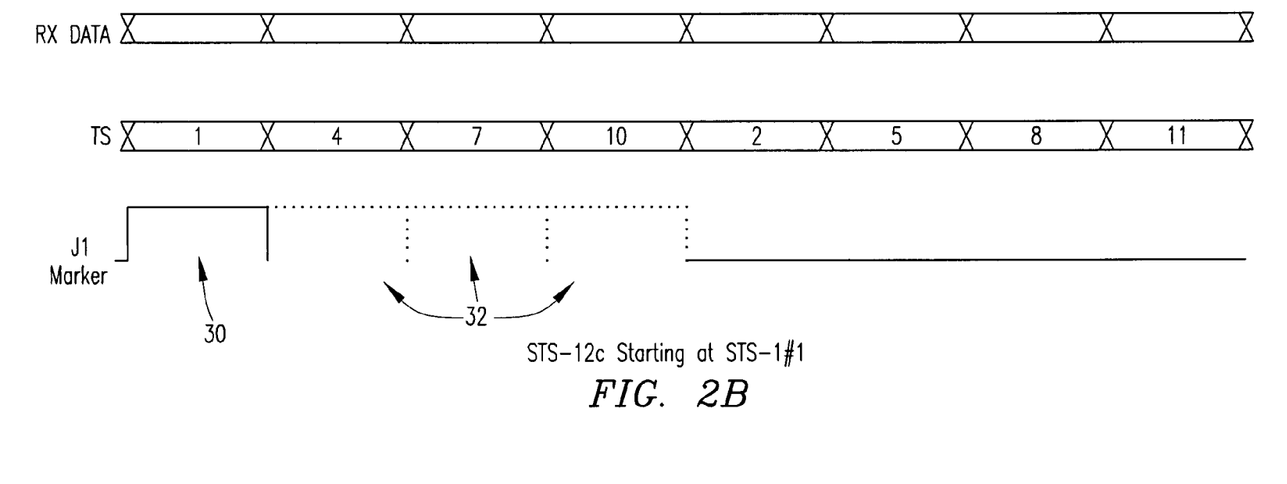

The foregoing may be better understood by referring to FIGS. 2A and 2B. Each of these figures shows a time slot (TS) progression and associated data relating to the included STS signals. In FIG. 2A, the time slot progression presents data relating specifically to the H4 byte, while in FIG. 2B, the time slot progression (which is obviously the same) presents data relating to the J1 byte. The solid lines in each figure represent the presence of H4/J1 marker data in time slot 1 (reference 30, for example, only) as would be expected for a pointer processed physically concatenated SONET signal 10 (for example, an STS-12c starting at STS-1 timeslot #1). Virtually concatenated signals, on the other hand, will have H4/J1 byte data associated with each individual included STS signal. The dotted lines in each figure represent the actions taken by the H4/J1 marker replication block on the pointer processed physically concatenated signal to replicate the H4/J1 data from a given time slot (for example, time slot 1 (reference 30)) and insert that replicated marker data in other time slots (for example, time slots 4, 7 and 10 (reference 32, for example, where 4 STS's make up the SONET signal)). The presence of H4/J1 marker data in each of these time slot locations (references 30 and 32) would be expected by virtual concatenation processing logic.

Strictly speaking, it will be understood that virtual concatenation logic may not require J1 markers in order to perform the necessary signal processing. The J1 position is required for LCAS (a companion technology to VCAT) and could either be marked as shown in FIG. 2A or alternatively determined by knowledge of the H4 position from its marker as shown in FIG. 2B. Thus, it will be understood that the block 20 is capable of performing both H4/J1 marker replication in one implementation. In other implementations, the block 20 may instead perform H4 replication alone. Still further, it will be understood that the block 20 need not actually perform H4/J1 replication, but rather could function in any way to simply indicate or flag for subsequent virtual concatenation processing the position of the path overhead (POH) bytes that would be sufficient to figure out where the J1 and H4 bytes are positioned.

The process performed by the H4/J1 marker replication block 20 completes the first step in modifying the received physically concatenated signal 10 into a virtually concatenated signal in accordance with an embodiment of the present invention.

The first step-modified SONET signal 22 (pointer processed with marker replication) may be carried in one embodiment by a Time Division Multiplexed (TDM) bus which includes byte-wide data and control signals indicating H4 byte presence and J1 byte presence as shown in FIGS. 2A and 2B. A more detailed understanding of the structure and operation of the TDM bus may be obtained by reference to U.S. application patent Ser. No. 10/421,018, filed Apr. 22, 2003, the disclosure of which is hereby incorporated by reference. Although the TDM bus is used in one preferred embodiment, it will be understood that any suitable transport medium may be used in other embodiments to convey data and control signals. For example, one could instead use a byte index reference to the start of the SONET SPE.

A second step for modifying the received physically concatenated signal into a virtually concatenated signal is then performed on the first step-modified SONET signal 22 (for example, as provided at the other end of the TDM bus). This second step addresses another difference between virtually and physically concatenated SONET signals. It is noted that a virtually concatenated signal possesses two properties not shared with a physically concatenated signal. A first of these properties is referred to by those skilled in the art as differential delay, and refers to the fact that virtually concatenated SONET signals may take different physical transmission paths (with different delays) between transmitter and receiver. This property is addressed in virtually concatenated signals through the use of the multi-frame indicator (MFI) which allows for frame alignment to be accomplished at the receiver. A second of these properties is related to the fact that the order of data multiplexing in virtually concatenated signals is arbitrary. This property is addressed in virtually concatenated signals through the use of a sequence number (SEQ#) which tells the receiver where the first byte is located. The MFI and SEQ# data is often commonly referred to by those skilled in the art as virtual concatenation (VCAT) overhead (OH) data.

Figure 3:
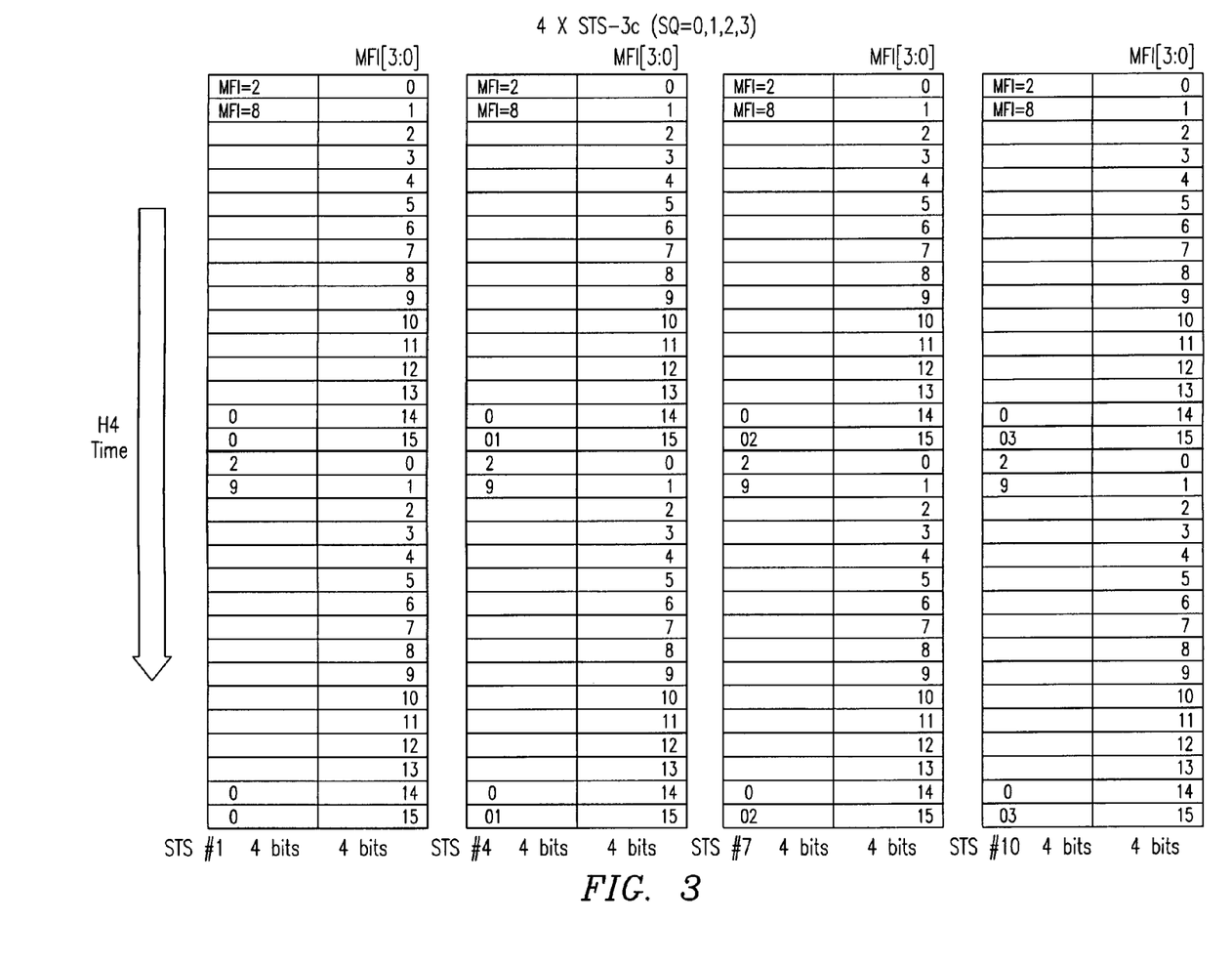
FIG. 3 illustrates data bus data.

Virtual concatenation logic 18 expects a received virtually concatenated SONET signal to include the necessary MFI and SEQ# VCAT OH data that would allow the receiver to reconstruct the originally transmitted signal. The receiver of FIG. 1 includes a VCAT OH insertion block 40. This block 40 essentially operates to insert MFI and SEQ# data into the received signal 22. An understanding of the result of VCAT insertion block 40 operation may be better understood by referring to FIG. 3. FIG. 3 assumes, for example, that the received physically concatenated SONET signal is an STS-12c signal. This signal can be broken down into four (4) STS signals. FIG. 3 illustrates the data of the signal 22 (for example, which is present on the TDM bus), over time, at the H4 byte time slot only. The VCAT OH insertion block 40 essentially inserts, into the H4 byte, the illustrated data for each of the four STS signals. The inserted data comprises, in the lower nibble [3:0] of the H4 byte, the [3:0] nibble of the MFI which is commonly referred to as MFI1, and in the upper nibble [7:4] of the H4 byte, one of: the [11:4] bits of the MFI which is commonly referred to as MFI2, "0000", or the sequence number SEQ#. Thus, it will be noted that for the top half of the figure (representing four STS signals over the H4 time slots of a single frame) that the STS signals have the same MFI and an incrementing (0, 1, 2, 3) SEQ#. Similarly, in the bottom half of the figure, the next frame is shown with H4 values showing an incremented MFI (29 instead of 28) and the same incrementing SEQ# values. The result is that the H4 marker bytes across all of the includes STS signals now have VCAT OH data and can be processed by the virtual concatenation logic.

It will be noted that the H4 byte values (VCAT OH) in the constituent STS signals are unique at the output of the VCAT OH insertion block 40. This is to be expected as separate STS signals within a virtually concatenated SONET signal will naturally possess differing H4 marker data. The replication of the H4 markers performed by the H4/J1 marker replication block 20 in the first step is necessary to place some data in the H4 bytes of each STS signal, with this marker being detected through the TDM control signals and used as a trigger in the second step by the block 40 to perform the MFI/SEQ# insertion which is required to distinguish between the included STS signals and make the overall physically concatenated signal look like a virtually concatenated signal.

Figure 4:
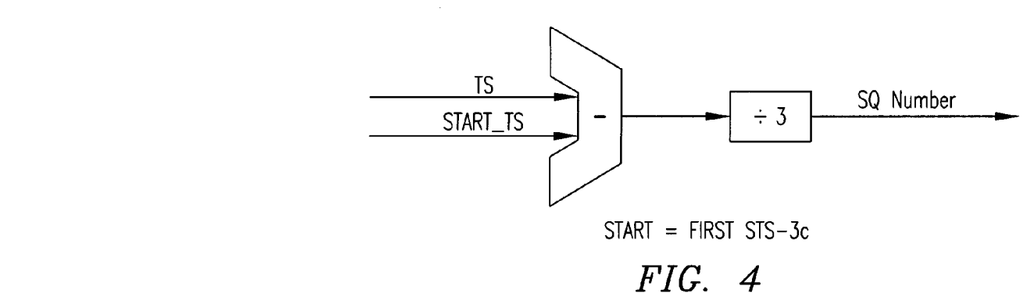
FIG. 4 is a block diagram for a sequence number generator.

To summarize, according to SONET/SDH standards for virtual concatenation, a unique sequence number is required for each member of the virtually concatenated signal and sequence numbers must be sequential starting at zero. Although virtual concatenation allows arbitrary assignment of sequence numbers to member SONET/SDH paths, this is not necessary to represent a physically concatenated signal as a virtually concatenated signal. In this case the multiplexing order (specified by the sequence number assignment) is known and fixed according to standard SONET/SDH multiplexing. Therefore, the appropriate sequence number (SQ) for each member path can be simply calculated by the formula: SQ=(sts_num−start_sts_num)/3 where sts_num represents the STS-1 # of the SONET path and start_sts_num represents the STS-1 # of the first member path. This calculation may be implemented by a processing circuit of the type illustrated by example in FIG. 4 where a subtractor subtracts the start sts_num (as known from circuit provisioning) from the current time slot number (as known from the TDM bus; see FIGS. 2A and 2B) and a divider divides the result by three to generate an eight bit SEQ#.

The MFI value is used to track the differential delay between any two members of a virtually concatenated signal. Conceptually speaking, on transmission the same MFI value is inserted into each of the members every frame. More literally, only a portion of the MFI (i.e., MFI1) is inserted every frame an the rest (i.e., MFI2) is inserted in specific frames indicated by the value of MFI1 (as shown in FIG. 3). Each frame MFI the value is incremented before insertion. This provides an incrementing frame count which is synchronized at the source end which is then used at the sink end to determine the differential delay experienced between members of a virtually concatenated signal. Because physically concatenated signals are by their definition required to accumulate no differential delay in transmission, the differential delay between constituent STS signals in a larger physically concatenated signal at the sink is known to be zero.

Figure 5:
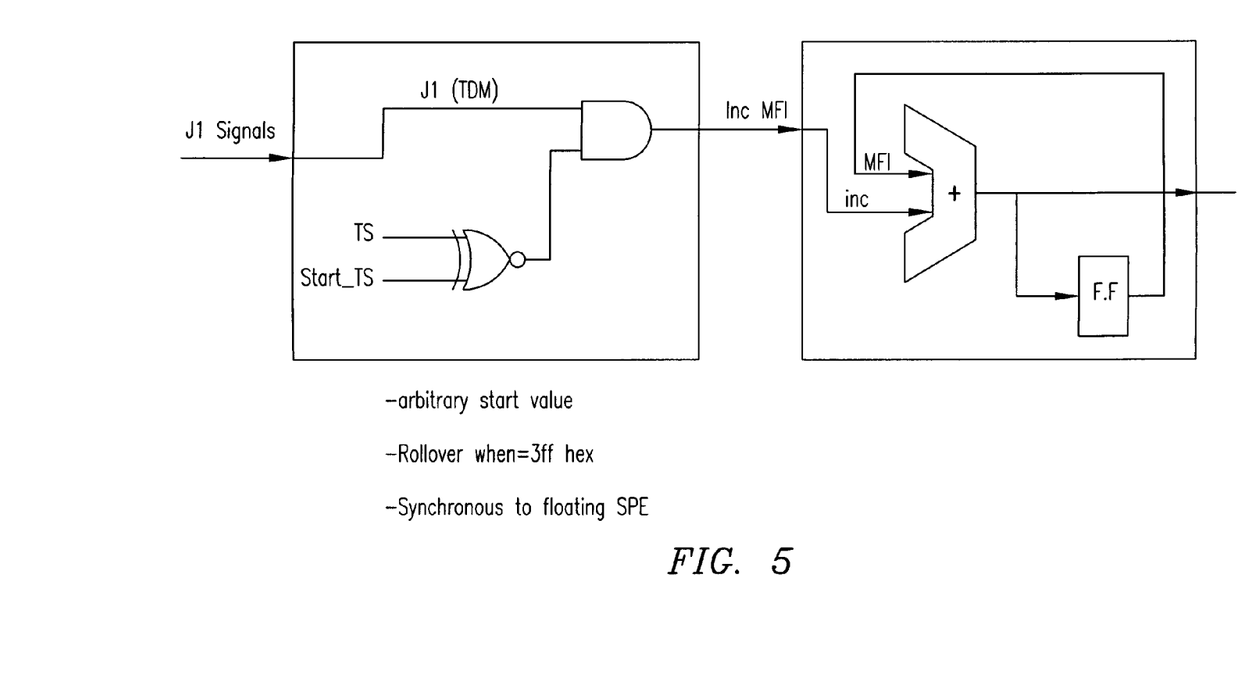
FIG. 5 is a block diagram for an MFI generator.

An exemplary processing circuit for generating the MFI number is shown in FIG. 5. From the signal 22 (for example, on the TDM bus and as shown in FIGS. 2A and 2B), the current time slot number and the presence of the J1 marker may be obtained. An XOR process compares the current time slot with a fixed (perhaps arbitrary) start time slot. If the time slots are the same, and if that slot is at the J1 marker, the AND process outputs an increment signal (INC MFI). More generally speaking, the process need only use the POH marker of any one of the STS signals of the physically concatenated signal, and thus incrementing of the MFI need only be made once per received set of H4 markers. A current value of the MFI is stored in a memory (comprising, for example, a flip flop FF) whose output is fed back to the input of an incrementor device. The other input of the incrementor device receives the increment signal INC MFI. When INC MFI is true, the incrementor increments the MFI signal (which is then stored, as updated, in the memory flip flop). The output of the incrementor is supplied as the MFI signal.

Figure 6:
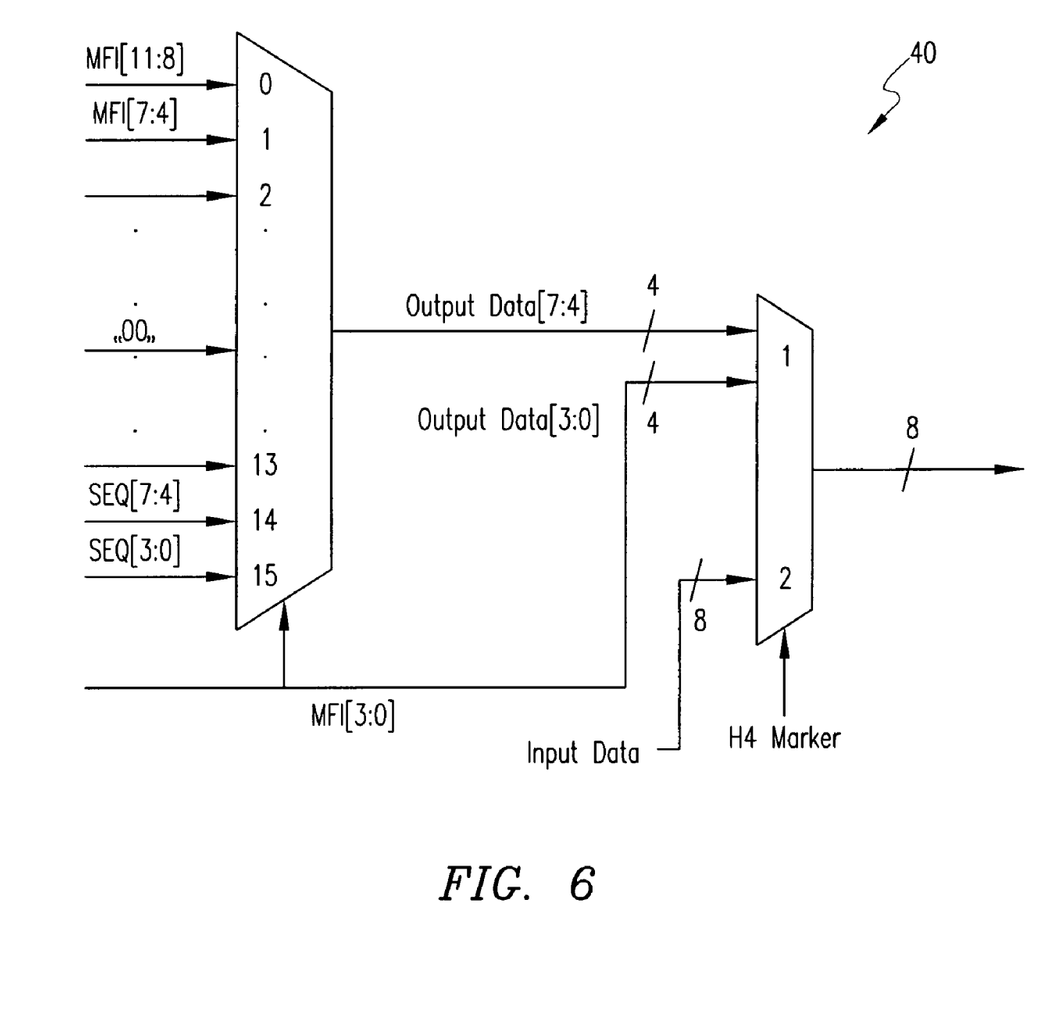
FIG. 6 is a block diagram for an overhead insertion multiplexer.

The VCAT OH insertion block 40 may be implemented, as illustrated in FIGS. 1 and 6, as a multiplexer (although other implementations may, of course, be used). FIG. 6 illustrates the particulars of one preferred multiplexer implementation. An H4 MUX is triggered by an H4 time slot signal (i.e., a signal indicating the presence on the TDM bus of the H4 time slot). When false (logic "0"), the H4 MUX allows the input data (comprising the physically concatenated SONET signal received payload and overhead to be inserted onto the TDM bus. When true (logic "1"), the H4MUX inserts onto the TDM bus in the location of the H4 time slot the VCAT OH data. An example of such an insertion was discussed above and shown in FIG. 3. This VCAT OH data comprises the lower nibble [3:0] of the MFI signal (from FIG. 5) plus an upper nibble [7:4] of output data from an MFI/SEQ MUX. The MFI/SEQ MUX is triggered by the lower nibble [3:0] of the MFI signal and thus operates to select between sixteen possible inputs (0-15) as the output data. When the MFI signal is 0, the upper nibble MFI [11:8] is presented as the output data. When the MFI signal is 1, the middle nibble MFI [7:4] is presented as the output data. When the MFI signal is 2-13, logic "0000" is presented as the output data. When the MFI signal is 14, the upper nibble [7:4] of the SEQ# is presented as the output data. Finally, when the MFI signal is 15, the lower nibble [3:0] of the SEQ# is presented as the output data. The result of the foregoing operation is illustrated quite effectively in FIG. 3.

The concepts described above for received SONET signals are also applicable to transmitted SONET signals (see, FIG. 1). For example, the virtual concatenation logic 18 can create a virtual concatenation signal 50. This signal 50 can be applied for pointer insertion 52 to create the virtually concatenated SONET signal 54. If the intent, however, is to transmit a physically concatenated SONET signal 56, then the virtually concatenated signal may be applied to a multiplexing (or other suitable functionality) 58 to null out or prevent insertion of VCAT OH for the H4 bytes and ensure insertion of the proper H1/H2 pointer values indicating concatenation for pointer in all but the first STS signal comprising the physically concatenated signal. The reason for this is that there is a specific value for pointers (H1/H2 bytes) in SONET/SDH for indicating that an STS signal is part of a larger physically concatenated signal, and all but the first of these STS signals contain the special value, while the first STS signal contains a normal value. Thus, pointer inserter 52 functions to insert normal pointer values for each STS signal of a virtually concatenated signal, and further insert the appropriate concatenation indicator value for each, but the first, STS signal in order to form the physically concatenated signal.

While the embodiments disclosed above relate to virtually concatenated signals, it will be understood that such embodiments are fully capable of processing multiple virtually concatenated signals simultaneously and thus could process a mixture of virtually concatenated and converted virtually concatenated signals (i.e., a physically concatenated signal converted to appear as a virtually concatenated signal in the manner taught herein) simultaneously.

An advantage of the embodiments disclosed above is that physically concatenated signals can be processed at the receiver by virtual concatenation logic in a manner such that this processing need not be known to the transmitter. Conversely, physically concatenated signals can be generated at a transmitter from virtual concatenation signals in a manner such that this type of generation need not be known to the receiver.

With reference once again made to FIG. 1, the circuit illustrated is preferably part of an overall integrated circuit design fabricated on a single integrated circuit substrate. Advantageously, such a single integrated circuit can handle both physically and virtually concatenated signals in a circuit environment which includes a virtually concatenation logic block but does not include a physical concatenation logic block.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. An integrated circuit for synchronous optical network or synchronous digital hierarchy or optical transport network (SONET) signal termination, comprising:
   virtual concatenation logic;
   an input for receiving either virtually concatenated or physically concatenated SONET signals;
   a pointer processor for receiving either of the SONET signals and outputs a pointer processed virtually concatenated SONET signal to the virtual concatenation logic and outputs a pointer processed physically concatenated SONET signal, wherein, in response to the SONET signals being a physically concatenated SONET signal, the pointer processor operates on the received physically concatenated SONET signal to identify synchronous transport signal (STS) locations within the pointer processed physically concatenated SONET signal;
   a virtual concatenation overhead insertion circuit for inserting virtual concatenation overhead data into the pointer processed physically concatenated SONET signal so as to produce a converted virtually concatenated SONET signal for output to the virtual concatenation logic.

2. The circuit of claim 1 wherein the pointer processor operates on the received physically concatenated SONET signal to output the pointer processed physically concatenated SONET signal including SONET synchronous payload envelope (SPE) data along with J1 and H4 byte markers.

3. The circuit of claim 2 further including a marker replication circuit that replicates the J1 and H4 byte markers produced by the pointer processor at the J1 and H4 byte marker locations for each STS signal within the pointer processed physically concatenated SONET signal.

4. The circuit of claim 1 further including a marker circuit that inserts missing J1 and H4 byte markers for each STS signal in the pointer processed physically concatenated SONET signal.

5. The circuit of claim 1 further including a marker circuit that inserts missing J1 byte markers for each STS signal in the pointer processed physically concatenated SONET signal.

6. The circuit of claim 1 further including a marker circuit that inserts missing H4 byte markers for each STS signal in the pointer processed physically concatenated SONET signal.

7. The circuit of claim 1 wherein the signal locations comprise byte marker locations.

8. The circuit of claim 1 wherein the pointer processor operates on the received physically concatenated SONET signal to identify STS signal locations within the pointer processed physically concatenated SONET signal, and the virtual concatenation overhead insertion circuit inserts appropriate virtual concatenation overhead data for each STS signal within the pointer processed physically concatenated SONET signal.

9. The circuit of claim 1 wherein the virtual concatenation overhead insertion circuit inserts MFI and SEQ# data within the pointer processed physically concatenated SONET signal to produce the converted virtually concatenated SONET signal.

10. The circuit of claim 9 wherein the MFI and SEQ# number data is inserted at appropriate H4 byte marker locations within the pointer processed physically concatenated SONET signal.

11. A synchronous optical network or synchronous digital hierarchy or optical transport network (SONET) signal termination method, comprising:
    receiving either virtually concatenated or physically concatenated SONET signals;
    pointer processing either of the SONET signals to output a pointer processed virtually concatenated SONET signal or a pointer processed physically concatenated SONET signal, respectively;
    inserting virtual concatenation overhead data into the pointer processed physically concatenated SONET signal so as to produce a converted virtually concatenated SONET signal; and
    outputting the pointer processed virtually concatenated signal or the converted virtually concatenated signal to a virtual concatenation logic processing, wherein the pointer processing comprises, in response to the SONET signals being a physically concatenated SONET signal, identifying STS signal locations within the pointer processed physically concatenated SONET signal.

12. The method of claim 11 wherein pointer processing operates on the received physically concatenated SONET signal to output the pointer processed physically concatenated SONET signal including SONET synchronous payload envelope (SPE) data along with J1 and H4 byte markers.

13. The method of claim 12 further including performing marker replication so as to replicate the pointer processing J1 and H4 byte markers at J1 and H4 byte marker locations for each synchronous transport signal (STS) signal within the pointer processed physically concatenated SONET signal.

14. The method of claim 11 further including inserting missing J1 and H4 byte markers for each STS signal in the pointer processed physically concatenated SONET signal.

15. The method of claim 11 further including inserting missing J1 byte markers for each STS signal in the pointer processed physically concatenated SONET signal.

16. The method of claim 11 further including inserting missing H4 byte markers for each STS signal in the pointer processed physically concatenated SONET signal.

17. The method of claim 11 wherein the signal locations comprise byte marker locations.

18. The method of claim 11 wherein pointer processing comprises identifying STS signal locations within the pointer processed physically concatenated SONET signal, and wherein inserting comprises inserting appropriate virtual concatenation overhead data for each STS signal within the pointer processed physically concatenated SONET signal.

19. The method of claim 11 wherein inserting comprises inserting MFI and SEQ# data within the pointer processed physically concatenated SONET signal to produce the converted virtually concatenated SONET signal.

20. The method of claim 19 wherein the MFI and SEQ# number data is inserted at appropriate H4 byte marker locations within the pointer processed physically concatenated SONET signal.

21. A circuit for terminating a physically concatenated synchronous optical network (SONET) or synchronous digital hierarchy (SDH) or optical transport network (OTN) signal, comprising:
a processing circuit that receives a physically concatenated signal, identifies path overhead location within the physically concatenated signal and outputs a processed physically concatenated signal;
a virtual concatenation overhead insertion circuit that inserts virtual concatenation overhead data into the processed physically concatenated signal so as to produce a converted virtually concatenated signal; and
virtual concatenation logic for processing the converted virtually concatenated signal, wherein the processor circuit identifies path overhead location for a first synchronous transport signal (STS) within the physically concatenated signal.

22. The circuit of claim 21 wherein the processor circuit identifies path overhead locations for each STS signal within the physically concatenated signal.

23. The circuit of claim 21 wherein the identified path overhead location is the location of at least one byte marker.

24. The circuit of claim 23 wherein the byte marker comprises at least one of a J1 byte marker and an H4 byte marker.

25. The circuit of claim 24 wherein the processor operates to replicate the J1 and H4 byte markers of a first STS signal in the physically concatenated signal at each included STS signal in the physically concatenated signal.

26. The circuit of claim 21 wherein the processor circuit identifies STS signal locations within the physically concatenated signal, and the virtual concatenation overhead insertion circuit inserts appropriate virtual concatenation overhead data for each included STS signal within the processed physically concatenated signal.

27. The circuit of claim 26 wherein the appropriate virtual concatenation overhead data comprises MFI and SEQ# data.

28. The circuit of claim 27 wherein the MFI and SEQ# number data is inserted at appropriate H4 byte marker locations for each STS signal within the physically concatenated signal.

29. A method for terminating a physically concatenated synchronous optical network (SONET) or synchronous digital hierarchy (SDH) or optical transport network (OTN) signal, comprising:
processing the physically concatenated signal to identify path overhead location within that physically concatenated signal and output a processed physically concatenated signal;
inserting virtual concatenation overhead data into the processed physically concatenated signal so as to produce a converted virtually concatenated signal; and
virtual concatenation logic processing of the converted virtually concatenated signal, wherein the processing further includes processing to identify path overhead location for a first synchronous transport signal (STS) within the physically concatenated signal.

30. The method of claim 29 wherein processing further comprises identifying path overhead locations for each STS signal within the physically concatenated signal.

31. The circuit of claim 30 wherein the identified path overhead location is the location of at least one byte marker.

32. The method of claim 31 wherein the byte marker comprises at least one of a J1 byte marker and an H4 byte marker.

33. The method of claim 32 wherein processing further comprises replicating the J1 and H4 byte markers of a first STS signal in the physically concatenated signal at each included STS signal in the physically concatenated signal.

34. The method of claim 29 wherein processor comprises identifying STS signal locations within the physically concatenated signal, and inserting comprises inserting appropriate virtual concatenation overhead data for each included STS signal within the processed physically concatenated signal.

35. The method of claim 34 wherein the appropriate virtual concatenation overhead data comprises MFI and SEQ# data.

36. The method of claim 35 wherein the MFI and SEQ# number data is inserted at appropriate H4 byte marker locations for each STS signal within the physically concatenated signal.

37. A circuit for synchronous optical network (SONET) or synchronous digital hierarchy (SDH) or optical transport network (OTN) signal generation, comprising:
virtual concatenation logic that generates a virtual concatenation signal;
a pointer inserter to produce a pointer inserted virtually concatenated signal from the virtual concatenation signal; and
a stripping circuit to null out or prevent insertion of virtual concatenation overhead data from the pointer inserted virtually concatenated signal to generate a physically concatenated signal, wherein the pointer inserter inserts normal pointer values in each synchronous transport (STS) signal for a virtually concatenated signal and further inserts a concatenation indicator value in each but a first of the STS signals for the physically concatenated signal.

38. The circuit of claim 37 wherein the stripped virtual concatenation overhead data comprises MFI and SEQ# data.

39. A method for synchronous optical network (SONET) or synchronous digital hierarchy (SDH) or optical transport network (OTN) signal generation, comprising:
generating a virtual concatenation signal by virtual concatenation logic;
producing a pointer inserted virtually concatenated signal from the virtual concatenation signal; and
nulling out or preventing insertion of virtual concatenation overhead data from the pointer inserted virtually concatenated signal to generate a physically concatenated signal, wherein the producing comprises inserting normal pointer values in each synchronous transport (STS) signal for a virtually concatenated signal and further inserting a concatenation indicator value in each but a first of the STS signals for the physically concatenated signal.

40. The method of claim 39 wherein the stripped virtual concatenation overhead data comprises MFI and SEQ# data.

41. An integrated circuit for terminating a synchronous optical network (SONET) or synchronous digital hierarchy (SDH) or optical transport network (OTN) signal, comprising:

on a single integrated circuit substrate:
a signal termination circuit operable to terminate both a received virtually concatenated signal and a received physically concatenated signal, wherein the signal termination circuit comprises a virtual concatenation logic and a conversion circuit that includes a pointer processor operable to identify path overhead locations within the physically concatenated signal, the conversion circuit being operable to convert the received physically concatenated signal into a pointer processed virtually concatenated signal suitable for processing by the virtual concatenation logic, wherein the virtual concatenation logic inserts virtual concatenation overhead data into the pointer processed virtually concatenated signal to produce a converted virtually concatenated signal, and wherein the received virtually concatenated signal is a SONET or SDH or OTN signal and the received physically concatenated signal is a SONET or SDH or OTN signal.

42. The circuit of claim 41 wherein the signal termination circuit includes the virtual concatenation logic circuit but does not include a physical concatenation logic circuit.

43. The circuit of claim 41 wherein the conversion circuit includes a processing circuit that indicates to the virtual concatenation logic differential delay data and data multiplexing data with respect to the physically concatenated signal.

44. The circuit of claim 43 wherein the virtual concatenation logic further includes an overhead insertion circuit that operates to modify path overhead in the physically concatenated signal to indicate the differential delay and data multiplexing data and thus produce the converted virtually concatenated signal.

45. The circuit of claim 44 wherein the overhead insertion circuit modifies an H4 byte value for each included synchronous transport (STS) signal in the physically concatenated signal.

46. The circuit of claim 45 wherein the overhead insertion circuit inserts MFI and SEQ# data in the H4 byte marker.

47. The circuit of claim 43 wherein the processing circuit comprises a pointer processor operable to identify path overhead locations within the physically concatenated signal.

48. The circuit of claim 47 wherein the path overhead locations comprise J1 and H4 byte marker locations.

49. The circuit of claim 47 wherein the path overhead locations are identified for each STS signal included within the physically concatenated signal.

50. The circuit of claim 41 wherein the conversion circuit includes a processing circuit that indicates to the virtual concatenation logic differential delay data with respect to the physically concatenated signal.

51. The circuit of claim 50 further including an overhead insertion circuit that operates to modify path overhead in the physically concatenated signal to indicate the differential delay and thus produce the converted virtually concatenated signal.

52. The circuit of claim 51 wherein the overhead insertion circuit modifies an H4 byte value for each included STS signal in the physically concatenated signal.

53. The circuit of claim 41 wherein the conversion circuit includes a processing circuit that indicates to the virtual concatenation logic data multiplexing data with respect to the physically concatenated signal.

54. The circuit of claim 53 further including an overhead insertion circuit that operates to modify path overhead in the physically concatenated signal to indicate the data multiplexing data and thus produce the converted virtually concatenated signal.

55. The circuit of claim 54 wherein the overhead insertion circuit modifies an H4 byte value for each included STS signal in the physically concatenated signal.

56. A method for terminating a synchronous optical network (SONET) or synchronous digital hierarchy (SDH) or optical transport network (OTN) signal, comprising:

receiving a virtually concatenated signal and a physically concatenated signal on a single integrated circuit substrate, wherein the physically concatenated signal is a SONET or SDH or OTN signal; and
terminating both the received virtually concatenated signal and the received physically concatenated signal using a common signal termination circuit, wherein the terminating further includes:
identifying path overhead locations within the physically concatenated signal to produce a pointer processed virtually concatenated signal, and
inserting virtual concatenation overhead data into the pointer processed virtually concatenated signal.

57. The method of claim 56 wherein the common signal termination circuit includes a virtual concatenation logic circuit but does not include a physical concatenation logic circuit.

58. The method of claim 56 wherein terminating comprises converting the received physically concatenated signal into a converted virtually concatenated signal and virtual concatenation logic processing of the converted virtually concatenated signal.

59. The method of claim 58 wherein converting includes providing an indication of differential delay data and data multiplexing data with respect to the physically concatenated signal.

60. The method of claim 59 further including modifying path overhead in the physically concatenated signal to indicate the differential delay and data multiplexing data and thus produce the converted virtually concatenated signal.

61. The method of claim 60 wherein modifying comprises modifying an H4 byte value for each included STS signal in the physically concatenated signal.

62. The method of claim 61 wherein modifying comprises inserting MFI and SEQ# data in the H4 byte marker.

63. The method of claim 59 wherein converting further comprises identifying path overhead locations within the physically concatenated signal.

64. The method of claim 63 wherein the path overhead locations comprise J1 and H4 byte marker locations.

65. The method of claim 63 wherein the path overhead locations are identified for each STS signal included within the physically concatenated signal.

66. The method of claim 58 wherein converting includes providing an indication of differential delay data with respect to the physically concatenated signal.

67. The method of claim 66 further including modifying path overhead in the physically concatenated signal to indicate the differential delay and thus produce the converted virtually concatenated signal.

68. The method of claim 67 wherein modifying comprises modifying an H4 byte value for each included STS signal in the physically concatenated signal.

69. The method of claim 58 wherein converting includes providing an indication of data multiplexing data with respect to the physically concatenated signal.

70. The method of claim 69 further including modifying path overhead in the physically concatenated signal to indicate the data multiplexing data and thus produce the converted virtually concatenated signal.

71. The method of claim 70 wherein modifying comprises modifying an H4 byte value for each included STS signal in the physically concatenated signal.

* * * * *

UNITED STATES PATENT AND TRADEMARK OFFICE
CERTIFICATE OF CORRECTION

PATENT NO.      : 7,620,030 B1                                           Page 1 of 1
APPLICATION NO. : 10/993138
DATED           : November 17, 2009
INVENTOR(S)     : David Kirk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1308 days.

Signed and Sealed this

Twenty-sixth Day of October, 2010

David J. Kappos
*Director of the United States Patent and Trademark Office*